May 8, 1934.  B. H. HAWKINS  1,957,835
SAFETY DEVICE FOR PUNCH PRESSES
Filed July 12, 1930   3 Sheets-Sheet 1

Inventor
Bert H. Hawkins

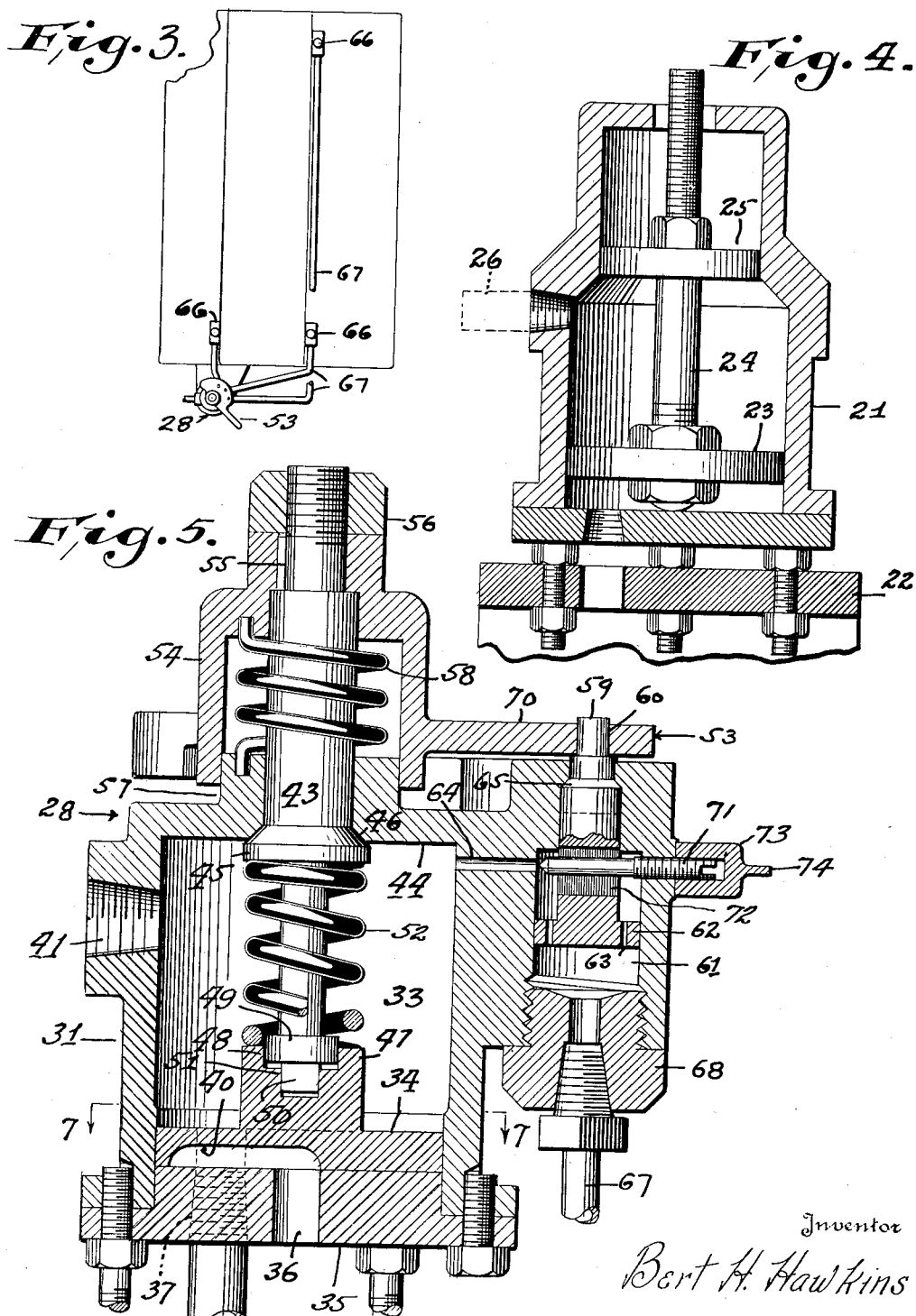

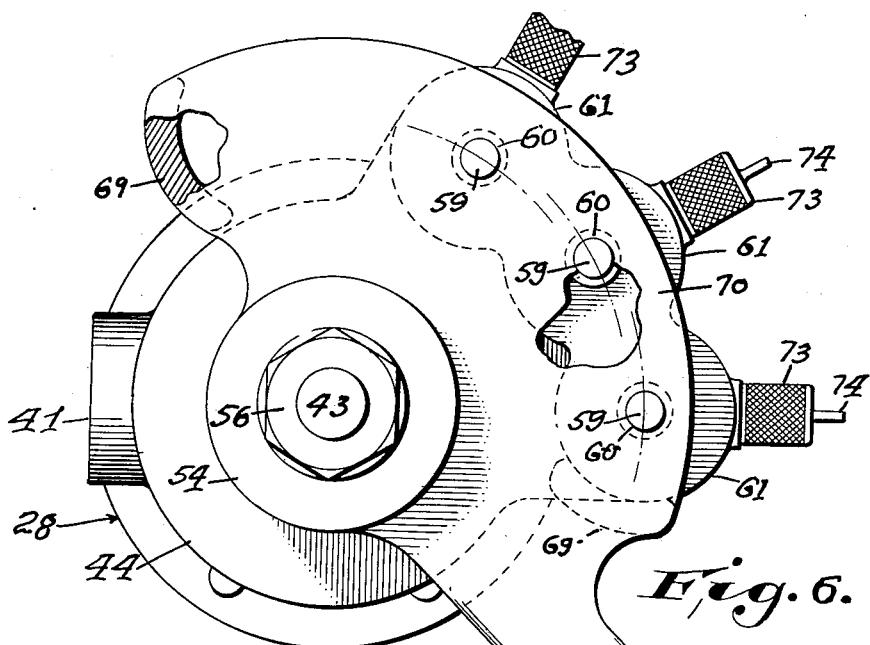
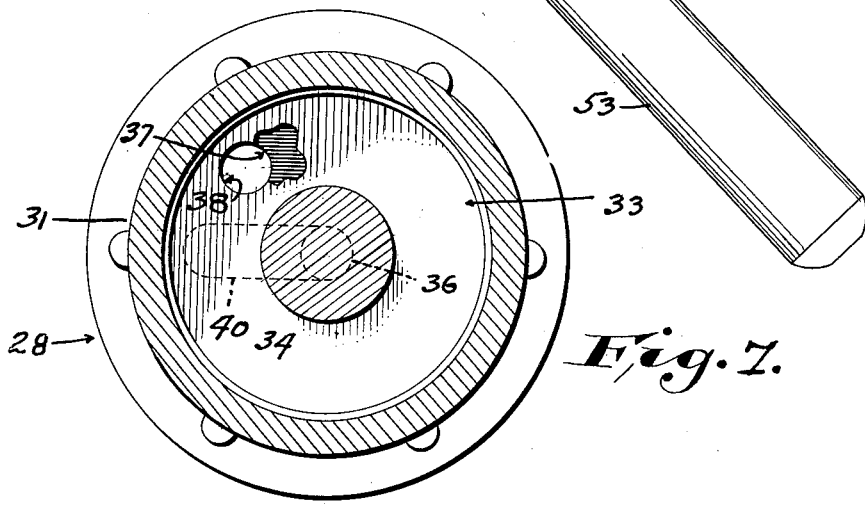
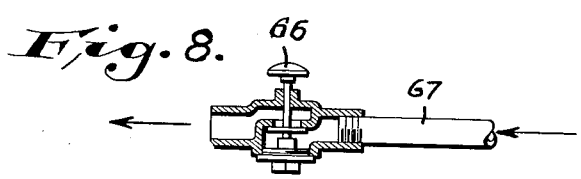

Patented May 8, 1934

1,957,835

UNITED STATES PATENT OFFICE 1,957,835

SAFETY DEVICE FOR PUNCH PRESSES

Bert H. Hawkins, Royal Oak, Mich., assignor to McCord Radiator & Manufacturing Company, Detroit, Mich., a corporation of Maine Application July 12, 1930, Serial No. 467,474

13 Claims. (Cl. 192—131)

This invention relates to safety devices for punch presses.

Among the objects of my invention is to provide a safety device so constructed and arranged that it will positively hold the clutch of the press released when moved into that position to prevent accidental repeating of the press and thus eliminate accidents which have frequently occurred through that source.

To carry out the foregoing object, I provide the safety device with a dead center position, which position is automatically assumed as the clutch is released and thus positively holds the clutch against accidental re-engagement to repeat the press.

Another object of my invention is to provide a power unit for actuating the safety device and thus have the latter within the positive control of the operator at all times, instead of depending on uncertain means, such as springs, electrical or other devices which are likely to become inoperative or faulty due to loose or worn connections or short circuits.

A further object of my invention is to employ a fluid pressure motor as the power unit and thus enable the clutch to be held in release position by pressure fluid which being substantially constant and positive is not subject to wear or jar as would any mechanical mechanism which might be employed to hold the clutch released.

A further object of my invention is to provide a control valve for controlling the actuation of the the fluid pressure motor and to have said valve so located on the press that it is within convenient reach of the operator and permit the operator to actuate the clutch whenever desired to start and stop the press.

A further object of my invention is to provide a novel form of lock for automatically locking the control valve in clutch releasing position as soon as the valve returns to that position and thus prevent accidental movement of the valve to repeat the press except when desired.

A further object of my invention is to provide a plurality of locking elements for the control valve so that all of said elements must be released from the valve before the latter can be moved to start the press and thus enable the locks to be actuated from various points about the press as required for a system of remote control. By this arrangement the operator on the front side of the press is prevented from setting the press in operation until after the operator on the rear side of the press has manipulated the controls for the locks on his side of the press.

A further object of my invention is to provide means to automatically return the control valve to press stopping position as soon as it is released by the operator and thus avoid any possibility of the press repeating by having the control valve remain in or adjacent to its press actuating position.

The invention consists further in the matters hereafter described and claimed.

In the accompanying drawings:

Fig. 3 is a diagrammatic view showing the remote control;

Fig. 4 is a vertical sectional view taken through the power unit;

Fig. 5 is a similar sectional view taken through the control valve;

Fig. 6 is a top plan view of the valve;

Fig. 7 is a horizontal sectional view taken through the valve on line 7—7 of Fig. 5; and Fig. 8 shows a fixture to be hereinafter described.

Figure 1:
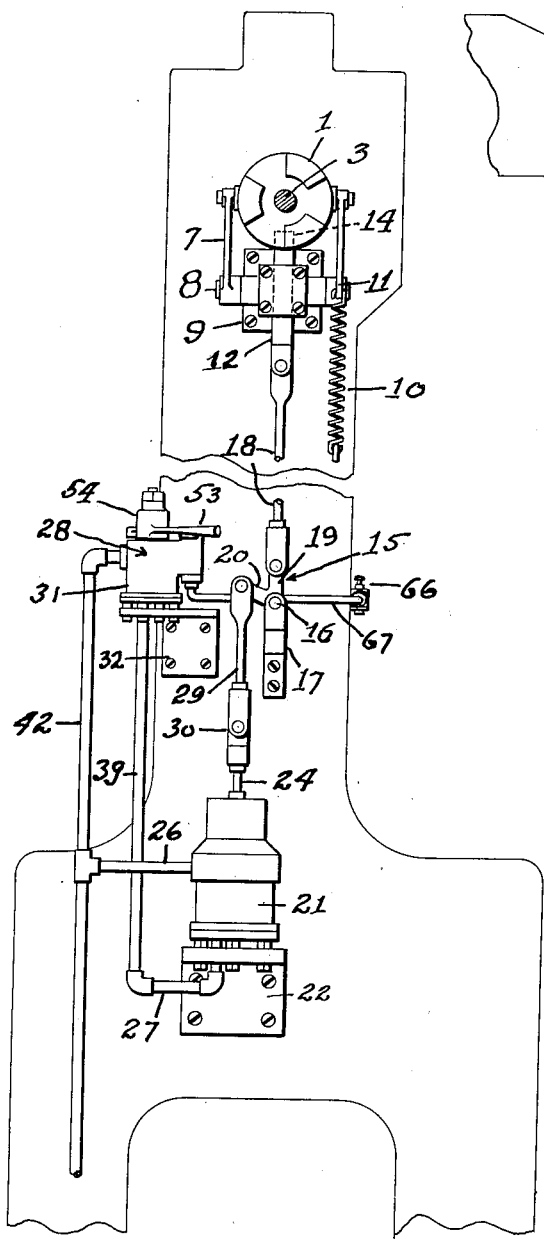
Fig. 1 shows the safety device of my invention applied to a punch press.
Figure 2:
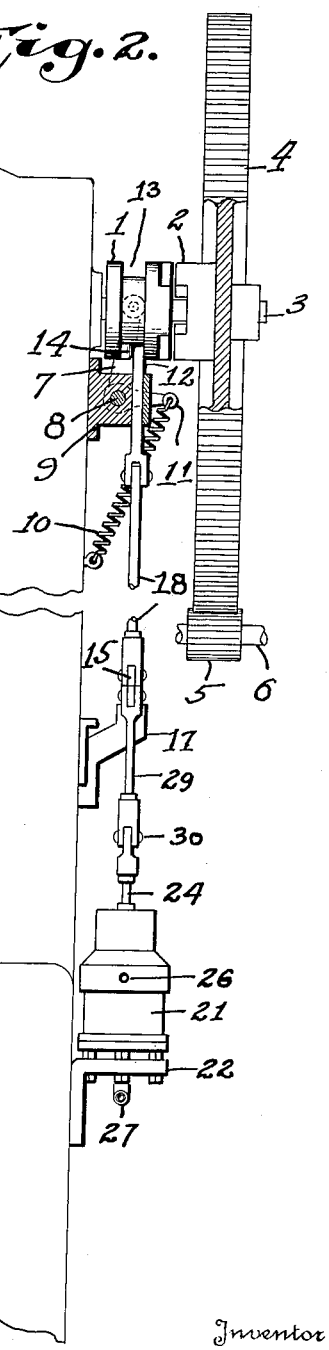
Fig. 2 is a side view of the device.

The press to which my invention is particularly applicable is of the intermittingly operated positive clutch type. The clutch is at one end of the press and includes two members 1, 2, both on the crank shaft 3, as in structures of this character. The member 1 is splined on the shaft for sliding movement into and out of clutched engagement with the other member 2 which is carried by a large gear wheel 4 revolubly mounted on the shaft 3 and meshing with a drive pinion 5 on a fly-wheel provided jack shaft 6, as shown in Fig. 2. The clutch members 1, 2 have lugs or teeth which when engaged connect the crank shaft 3 with the continuously revolving driving gear 4. In the particular form of press illustrated, a yoke 7 is used to slide the clutch member 1 into and out of engagement with the member 2, the yoke rocking on a horizontal axis 8 in a bracket 9 secured to the frame of the press, as shown in Figs. 1 and 2. The movement of the yoke to engage the clutch is effected by a coiled spring 10, one end of which is attached to the frame of the press and the other end to an arm 11 extending outward from the yoke. An endwise movable dog 12 is used to de-clutch the member 1 from the member 2. The upper end of the dog is beveled and when projected into an annular groove 13 in the member 1 in the path of a cam lug 14 in said groove, the contact of the lug with the dog causes member 1 to be slid out of engagement with member 2. Withdrawing the dog from the lug releases member 1 to the action of the spring 10 which slides member 1 into engagement with member 2.

The safety device of my invention comprises a bell-cvrank lever 15 fulcrumed at 16 to a bracket 17 fastened to the frame of the press. A link 18 connects the dog 12 with the arm 19 of the lever 15, and when the dog is in clutch releasing position, the pivotal connections between link 18, dog 12 and the fulcrum 16 are in direct alignment so that the parts are on dead center and the dog cannot be accidentally moved (see Fig. 1).

The other arm 20 of the bell-crank lever 15 extends outward from one side of the bracket 17 so that the lever may be turned about its fulcrum 16 to shift the lever off of dead center position to withdraw dog 12 from the clutch cam 14.

To shift the lever, I provide a power unit which, as shown in the drawings, is of the fluid pressure motor type. The motor comprises a cylinder 21 mounted on a bracket 22 secured to the base of the press on the same side as the safety device and below the same. Located in the lower portion of the cylinder 21 is a piston 23 connected to a rod 24 which extends outward through the upper end of the cylinder as shown in Figs. 1 and 4. A second piston 25 is secured to the rod 24 above the first piston and is smaller in diameter than the first piston. Piston 25 operates in the upper part of the cylinder which is made of a smaller diameter to accommodate the piston. With small and large pistons, their opposed surfaces present different pressure areas, so that when a pressure, such as provided by compressed air, is admitted into the cylinder 21 between the pistons, the piston assembly will be moved downward if the pressure below the larger piston is less than the pressure between the pistons.

A pipe 26 is connected to the cylinder 21 to admit fluid pressure therein between the pistons. A pipe 27 is connected to the lower end of the cylinder 21 to respectively admit and exhaust fluid pressure to and from the cylinder beneath the larger piston. A manually operable control valve 28 to be hereinafter described, is employed to control the pressure condition in the cylinder 21 between the pistons 23, 25 and beneath the larger piston 23. A constant supply of fluid pressure is maintained between the pistons so that when the pressure is reduced beneath the larger piston, the piston assembly will be moved downward to shift the lever 15 off of its dead center position to start the press. When the same pressure as maintained between the pistons is admitted beneath the larger piston, the pressure on opposite sides of the larger piston is balanced and the pressure between the pistons acts on the upper or smaller piston area to shift the lever 15 back to its dead center position to raise the dog 12 and stop the operation of the press. This is done after each downward or power stroke of the press to stop the press after one revolution of the driving gear 4. The arm 20 of the lever 15 is connected with the piston rod 24 by a link 29. To compensate for the arcuate movement of the arm 20, I connect the lower end of the link 29 with the upper end of the rod 24 by a clevis 30, as shown in Fig. 1.

The control valve 28 is mounted on the press in a position where it may be readily and conveniently reached by the operator while running the press. Said valve, as shown in Fig. 5, comprises a casing 31, secured to one of the upright standards to the press by a bracket 32. The casing 31 provides a chamber 33 in which is located a rotary valve 34, preferably in the form of a circular disc which fits in the chamber and seats against one of the end walls 35 of the same as shown. Said end wall 35 is provided with two ports 36, 37, the former being located at the center of the valve, and the other offset radially outward therefrom, as shown in Figs. 5 and 7. The valve member 34 is provided with a port 38 similarly offset as port 37 and when in register therewith in the turning of the valve connects chamber 33 with a pipe 39 which connects with port 37. Pipe 39 connects with pipe 27 which leads to the lower end of cylinder 21 beneath the large piston 23 therein, as shown in Fig. 1. Valve member 34 is provided in its under side with a radial groove 40, having its inner end constantly connected with port 36 and its outer end disposed to connect with port 37 in the turning of the valve. Port 36 is open to the atmosphere and when groove 40 connects ports 36, 37, the lower portion of cylinder 21 beneath piston 23 is exhausted and the piston assembly by fluid pressure is moved downward to shift lever 15 to start the press. With port 38 closed on its lower side at this time by the end wall 35 of the casing 31, there will be no movement of the fluid pressure through chamber 33. Casing 31 is provided in its side wall with a taped hole 41 whereby a fluid pressure supply pipe 42 may be connected with the casing to supply fluid pressure thereto above the valve member 34. Pipe 26, heretofore mentioned, connects with the main supply pipe 42 so as to supply fluid pressure to the cylinder 21 between the pistons therein without passing through the control valve. By this arrangement, both devices 21 and 28 are supplied with fluid pressure from the same source at the same time.

A shaft 43 is employed to turn the valve member 34. Said shaft as shown in Fig. 5 is made separate from the valve member and extends into the chamber 33 in axial alignment with the valve member through the other end wall 44 of the casing. Shaft 43 is provided with a collar 45 within the casing which collar is designed to seat against a taper 46 surrounding the opening in the end wall 44 through which the shaft extends. The portion of the shaft below the collar is reduced so as to provide a pressure surface for the collar, the purpose of which will presently appear. Valve member 34 is provided with hub portion 47 having a recess 48 at its upper end and into which recess extends an enlargement 49 on the reduced portion of the shaft adjacent its lower end, said enlargement fitting within the recess and serving as a guide for the shaft in the endwise movement permitted by the shaft and the valve member by reason of the key or tang connection 50 between the shaft and the hub of the valve member. The hub has a slot 51 at the bottom of the recess to receive the tang as shown in Fig. 5. A coiled spring 52 surrounds the portion of the shaft between the valve member 34 and the collar 45, and serves to aid the fluid pressure within the chamber 33 to maintain the valve member and the collar on their respective seats. The spring is employed in order to maintain the parts seated should the pressure within the chamber be reduced below that at which the parts would be held seated by the fluid pressure. Having the collar 45 seated against the edge of the aperture through which the shaft extends and held to its seat by spring and fluid pressure, the chamber cannot leak about the shaft and a stuffing box is not required thereby reducing the cost and maintenance of the device.

The shaft 43 extends outside of the casing 31 beyond the end wall 44, and is fitted with a handle or control member 53 by which the valve is turned. The control member 53 is provided with a central hollow hub 54 keyed at 55 to the shaft 43, a nut 56 being screwed on the outer end of the shaft to hold the control member in place. The end wall 44 is provided with an upwardly projecting boss 57 over which fits the lower open end of the hollow hub 54 to hold the control member central and prevent it from tilting. A coiled spring 58 is located in the hollow hub 54 and has one end connected with the hub and the other end connected with the boss 57 so that the spring will normally return the control member to a predetermined position, such as clutch disengaging position, as soon as the operator releases the handle after having moved it to or toward press starting position.

To prevent accidental turning of the control member 53 out of clutch disengaging position, I provide locking means which, as shown in the drawings, comprises a plurality of locking elements 59, 59, carried by the casing 31 at one side thereof, and which elements when in locking position have their outer ends projecting beyond the casing and engaging in a number of holes or recesses 60, 60 in the control member 53, as shown in Figs. 5 and 6. The elements 59 and their corresponding holes or recesses 60 are suitably arranged so that one locking element can not enter the aperture or recess of any other element. In the drawings, I have shown the parts arranged in circumferential spaced relation about the axis of the shaft 43 and at different radial distances from said axis so that one locking element cannot enter the aperture of another in the turning of the control member 53 into and out of press starting and stopping positions.

The movement of the locking elements 59 into and out of locking position is controlled through the fluid pressure which is employed to operate the safety device of my invention. In the particular arrangement showing in the drawings, this is brought about by providing the casing 31 with a plurality of cylinders 61, 61 into which extend the lower ends of the locking elements, which, in the form shown, are similar to plungers. Each plunger 59 has a piston element 62 at its lower end, which element divides the cylinder 61 into upper and lower chambers which communicate through one or more relatively small leak openings or holes 63 in the piston element, as shown in Fig. 5, for equalizing the pressure on both sides of the piston. The under side of the piston having a larger pressure area than on its upper side, the fluid pressure at this time will hold the plunger raised to lock the control member against movement. Fluid pressure is supplied to each cylinder 61 above the piston 62 therein by a passage 64 in the casing 31 between the cylinder and the chamber 33. When the plungers 59 are raised, the beveled surface 65 on each plunger seats against a complementary taper in the bore for the plunger and prevents leakage of fluid pressure out of the cylinder about the plunger.

A plurality of locking elements 59 are employed so that it will necessitate the two operators working on the press using both hands to start the press, thereby keeping their hands away from the die when the plunger descends. To manipulate these locks from the front and rear sides of the press so that the press cannot be operated except when all the locks have been released, I provide a plurality of push button relief valves 66, 66, one for each locking element and connected by pipes or conduits 67, with the lower ends of the respective cylinders 61. When the valve members of the relief valves are moved off their seats by the operators pushing inward on the buttons, the pressure in cylinders 61 beneath the pistons 62 will be relieved to the atmosphere through the discharge openings in the valves. This will effect the release of all of the locks 59 from the control member 53, and the latter can be moved by the operator to start the press. As shown in Fig. 3, two buttons 66 are located on the rear side of the press, and one on the front side adjacent the control valve 28.

The inward movement of the locks 59 is stopped by contact with the bottoms of the cylinders 61, which bottoms may be in the form of screw plugs 68 as shown in Fig. 5. When three locking members 59 are employed, a corresponding number of relief valves 66 will be employed, one for each locking member. With the relief valves 66 located on the front and rear sides of the press, as shown, the helper on the rear side of the press is required to manipulate both of the relief valves on his side of the press and the operator on the front side of the press must actuate his relief valve before the control member 53 is released for the operator to set the press in operation. This positively guards against any possibility of the operator setting the press in operation before both men have both hands clear of the press plunger.

The control member 53 is provided with a pair of stops 69, 69, arranged as to be brought alternately into and out of engagement with the portion of the casing 31 between them and thus limit the movement of the control member between clutch engaged and disengaged positions. To accommodate the apertures 60 in the control member 53, the latter is provided with a relatively flat plate portion 70 on the side of the control member in which the apertures are provided. This plate fits relatively close to the upper surface of the part of the casing 31 through which the locking elements 59 project and has a flat under surface to hold the locking elements depressed as the plate is moved into and out of press starting position. As soon as the control member effects disengagement of the clutch, the apertures 60 are brought opposite their respective plungers 59 and the latter by reason of the fluid pressure acting thereon after the relief valves are closed will move the plungers outward into the apertures and lock the control member against accidental movement.

With a press equipped with a safety device of my invention, accidental repeating of the press is positively prevented in the normal operation of the press. The device is especially serviceable on the so-called high speed presses, which by reason of the rapidity at which they operate return the plunger or ram so fast that an operator has practically no time in which to remove his hands from the path of the plunger should it accidentally repeat while the operator has his hands in the press. Moreover, these presses, by reason of their high speed often vibrate to some extent in operation and with the clutch held positively disengaged by my device accidental repeating of the press is prevented. The locking mechanism described holds the control member against accidental movement and prevents the operator from operating the control member to start the press only when the hands of both workmen on opposite sides of the press are in the clear, thereby preventing accidents as have heretofore happened due to accidental repeating of the press while the hands of one or both of the workmen are in the press either inserting a blank or removing a stamping. The safety device arranged to stop on a dead center when the clutch dog is in position to disengage the clutch and the safety device being held in that position by fluid pressure, there is no opportunity afforded for the dog to release the clutch except when desired by the operator.

Should it be necessary or desired at any time to operate the press without the locking elements 59, these may be held out of locking position by closing the passages 64 between the chamber 33 and the cylinders 61. One way in which this can be accomplished is shown in Fig. 5. As illustrated, I provide for each cylinder 61 a screw provided member 71 which extends into the cylinder in line with the passage through a slot 72 in the associated plunger 59, so that the inner end of the member 71 may reach the passage 64 and close it when the member is screwed against the end of the passage. A blind nut 73 is screwed on the outer end of the member 71 to lock it in either open or closed position. The outer end of the member 71 is provided with a slot or kerf whereby a screw driver may be engaged with the member to turn it. The nut 73 may be provided with a bit as shown at 74 in Fig. 5.

The details of structure and arrangement of parts shown and described may be variously changed and modified without departing from the spirit and scope of my invention.

I claim as my invention:

1. In a punch press, the combination with the clutch of the press and means for effecting engagement of the clutch to start the press, of a safety device for de-clutching the clutch to stop the press and for holding the clutch disengaged to prevent accidental repeating of the press, said device comprising means for de-clutching the clutch and for holding the same disengaged, a power unit for moving said means into and out of clutch disengaging position, and manually operable means for controlling the operation of said unit.

2. In a punch press, the combination with the clutch of the press, of a power unit for controlling the actuation of the clutch to start and stop the press, a manually operable control member for said unit, power operated latch means for releasably locking the control member in clutch releasing position on the control member reaching that position, and means on the press in remote relation to the latch means for controlling the application of power thereto to release the control member when it is desired to operate the same to start the press.

3. In a punch press, the combination with the clutch of the press, of a power unit for controlling the actuation of the clutch to start and stop the press, a manually operable control member for said unit, a plurality of power operated locking elements to simultaneously engage and lock the control member in clutch releasing position on the control member reaching that position, and means for controlling the application of power to said locking elements for releasing the control member when it is desired to start the press, said means being in the form of a remote control, one for each of the locking elements, and so disposed on the press that the hands of the operators when operating the controls will be clear of the dies of the press.

4. In a press, the combination with the clutch of the press, of a power unit for controlling the actuation of the clutch, manually operable control means for said unit, a plurality of locking elements to simultaneously engage and lock the control means in clutch releasing position, and means whereby any or all of the locking elements may be locked out of engagement with the control means.

5. In a press, the combination with the clutch of the press, of a power unit for controlling the actuation of the clutch, manually operable control means for said unit, and fluid pressure actuated locking means for locking the control means in clutch releasing position on the control means reaching that position.

6. In a press, the combination with the clutch of the press, of a power unit for controlling the actuation of the clutch, manually operable control means for said unit, a plurality of locking plungers for the control means, and means for applying fluid pressure to and exhausting it from said plungers to move the same into and out of engagement with said control means.

7. In a punch press, the combination with the clutch of the press and means for effecting engagement of the clutch to start the press, said clutch having relatively movable clutch members, one of which carries a releasing element, of a safety device for de-clutching the clutch to stop the press and for holding the clutch disengaged to prevent accidental repeating of the press, said device comprising means movable into and out of the path of said element for controlling the action of the clutch and for holding the same disengaged when maintained in the path of the element, a power unit for actuating said means, and manual operable means for controlling the operation of said unit.

8. In a press, the combination with the clutch of the press, of a fluid pressure motor for controlling the actuation of the clutch, manually operable control means for said motor, a plunger for locking and unlocking the control means, and means whereby the fluid pressure of the motor may be used to move the plunger into and out of locking position.

9. In a press, the combination with the clutch of the press and the control dog therefor, of a safety device connected with the dog to actuate the same to start and stop the press, said device having a dead center position to prevent accidental movement of the dog when holding the clutch disengaged, means for shifting the device off of its dead center position to start the press.

10. In a press, the combination with the clutch of the press and the control dog therefor, of a safety device having a bell-crank lever connected with the dog to actuate the same to start and stop the press, said lever and its connections with the dog having a dead center position when holding the dog in clutch releasing position to prevent accidental release of the clutch to start the press, and means for shifting the lever off of its dead center position to start the press.

11. In a press, the combination with the clutch of the press and the control dog therefor, of a safety device comprising a bell-crank lever fulcrumed on the press, a link connecting one arm of the lever to the dog, the connections between the link, the lever and the fulcrum therefor being in alignment when the dog is in clutch releasing position to prevent accidental release of the clutch of the press, and means connected with the other arm of the lever to shift the connections out of said dead center position to start the press.

12. In a press, the combination with the clutch of the press and the control dog therefor, of a safety device connected with the dog for actuating the same to start and stop the press, said device having a dead center position to prevent accidental release of the dog from the clutch to start the press, and fluid pressure actuated means connected with the device for shifting the same into and out of its dead center position to start and stop the press, said fluid pressure means serving to exert a fluid pressure on the device when in dead center position to positively prevent accidental release of the dog from the clutch.

13. In a press, a combination with the clutch of the press and the control dog therefor, of a safety device connected with the dog for actuating the same to start and stop the press, said device having a dead center position to hold the dog against accidental movement when in clutch releasing position, and a fluid pressure actuated means connected with the device for shifting the same on and off its dead center position to start and stop the press, said means having a stop to prevent movement of the device beyond the dead center position when actuating the dog to release the clutch.

BERT H. HAWKINS.